United States Patent [19]
Pletcher

[11] Patent Number: 5,592,670
[45] Date of Patent: Jan. 7, 1997

[54] AVOIDANCE OF DEADLOCKS IN A DEMAND PAGED VIDEO ADAPTER

[75] Inventor: Richard A. Pletcher, Redmond, Wash.

[73] Assignee: Microsoft Corporation, Redmond, Wash.

[21] Appl. No.: 970,118

[22] Filed: Nov. 2, 1992

[51] Int. Cl.⁶ .................................... G06F 9/00
[52] U.S. Cl. .................. 395/670; 395/726; 395/507; 395/501; 364/281.5; 364/281.3; 345/185; 345/132
[58] Field of Search .................... 395/115, 116, 395/162–166, 325, 375, 425, 725, 650, 859, 860, 280, 309, 310, 726, 427; 345/132, 185, 190, 203; 364/280, 281.3, 281.5

[56] References Cited

U.S. PATENT DOCUMENTS

| 4,422,145 | 12/1983 | Sacco et al. | 395/650 |
| 4,494,193 | 1/1985 | Brahm et al. | 364/200 |
| 5,006,980 | 4/1991 | Sander et al. | 395/375 |
| 5,016,167 | 5/1991 | Nguyen et al. | 364/200 |
| 5,113,180 | 5/1992 | Gupta et al. | 345/190 |
| 5,133,074 | 7/1992 | Chou | 395/725 |

OTHER PUBLICATIONS

IBM Technical Disclosure Bulletin vol. 21 #1, Jun. 1978 "Overlapped Checkpointing" by P. J. Lucas pp. 280–281.

Primary Examiner—Kee M. Tung
Attorney, Agent, or Firm—Seed and Berry LLP

[57] ABSTRACT

Deadlocks are avoided in an operating system that provides a demand paged memory. A process is granted access to only one page frame in the memory. As the memory is demand paged, a potential for a deadlock arises. The deadlocks may be avoided by determining whether a page currently in the page frame has been accessed. If the page in the page frame has not yet been accessed, a deadlock is imminent.

31 Claims, 9 Drawing Sheets

AVOIDANCE OF DEADLOCKS IN A DEMAND PAGED VIDEO ADAPTER

TECHNICAL FIELD

This invention relates generally to data processing systems and, more particularly, to a method and system for avoiding deadlocks in an operating system that provides a demand paged video adapter.

BACKGROUND OF THE INVENTION

A video adapter is a device that enables a video display to be interfaced with a data processing system. A primary role of the video adapter is to convert digital image data from the data processing system into electrical signals that may be used by the video display to generate images. The video adapter generally includes a video memory for holding a fixed amount of video data. Unfortunately, the addressable video memory of an adapter is typically quite small. For instance, a video graphics array (VGA) type adapter may have 1 megabyte of video memory or more, but only 64 kilobytes (K) of video memory (i.e., 16 pages of 4K) are visible to the CPU at any one time.

When an image is to be displayed on the video device, the pages of video data for the image are loaded from a linear address space into the video memory of the video adapter. The addressable video memory is part of the physical memory address space of the data processing system. Once the data is loaded into the video memory, the adapter then converts the video data in the video memory into electrical signals that are passed to the video display.

SUMMARY OF THE INVENTION

It is an object of the present invention to provide a method and system for avoiding deadlocks in an operating system that provides a demand paged video adapter.

It is a further object of the present invention to provide an improved operating system that is able to detect an imminent deadlock in an operating system that provides a demand paged video memory.

The foregoing and other objects, which will be apparent to those skilled in the art as preferred embodiments of the invention are described more fully below, are realized by the present invention. In accordance with a first aspect of the present invention, a method is practiced in a data processing system that includes a processor and a memory containing page frames that holds pages of memory. The processor executes an instruction requiring a piece of information from a first page of memory and a second page of memory. During the execution of the instruction, the processor has access to only one page frame in memory. The first page is stored in the page frame, and then a determination is made whether the first page has been accessed. Where the first page has not been accessed, it is detected that a deadlock is imminent.

The method of the first aspect of the present invention may additionally include the steps of storing an indication in memory of whether the first page has been accessed and then determining whether the first page has been accessed by examining the stored indication. This method may also include the additional steps of storing an entry in a table for the first page and the second page wherein each entry specifies whether the page has been accessed. The table may be a page table, and the page frame may be in a video memory. The instruction that is executed by the processor may be one in which the piece of information in the first page of memory is moved to a location in the second page of memory.

The method of the first aspect of the present invention may further comprise the step of detecting the absence of a deadlock when the first page has been accessed. In the absence of a deadlock, the execution of the instruction may be completed. The method may further include the additional step of taking preventive measures to avoid the deadlock. These preventive measures may include granting the processor access to at least one additional page frame.

In accordance with another aspect of the present invention, a method is practiced in a data processing system having a processor and a video memory comprised of at least one page frame. The processor executes a process that has access to only one page from the video memory. The process requires access to a first page of memory and a second page of memory in order to complete its execution. Per the method of this aspect of the present invention, the first page is mapped into the page frame to gain access to it. It is then determined whether the first page has been accessed. Where the first page has been accessed, the second page is mapped to the page frame. In contrast, where the first page has not been accessed, a potential deadlock is detected and measures are taken to avoid the deadlock.

The method may include the additional step of storing information regarding whether the first page has been accessed. This information may be stored with tables such as page table. When such information is stored, the step of determining whether the first page has been accessed may involve examining the stored information. This method may be practiced with a page frame of video memory. The steps of taking measures to avoid the deadlock may include the step of granting the process access to at least one additional page frame.

In accordance with yet another aspect of the present invention, a method is practiced in a data processing system having a processor concurrently running a first process and a second process. Per the method of this additional aspect of the present invention, the first process is granted access to select page frames of the video memory, whereas the second process is granted access to only a single page frame of the video memory. It is detected when a deadlock for the single page frame granted to the second process is imminent. In such an instance, steps are taken to avoid the deadlock.

In accordance with a further aspect of the present invention, a data processing system includes a video display device for displaying images. The system also includes a video memory for holding video data for image to be displayed on the video display device. The video memory is divided into a number of page frames. The data processing system further includes a memory for holding pages of video data and a processing mechanism.

The processing mechanism contains a process control unit for controlling a process to grant the process access to only a single page frame of the video memory. The processing mechanism also includes a demand pager for demand paging pages of memory into the single page frame of the video memory that is accessible by the process. The processing mechanism further includes a deadlock detector unit for detecting whether a deadlock for the page frame is imminent. Lastly, the processing mechanism includes a deadlock avoidance unit for avoiding a deadlock when the deadlock detector unit determines that a deadlock is imminent. The data processing system may also additionally include a video adapter for interfacing the video display with the video memory. The video adapter may be a video graphics array (VGA).

BRIEF DESCRIPTION OF THE DRAWINGS

A preferred embodiment of the present invention will be described below with reference to the drawings.

DETAILED DESCRIPTION OF THE INVENTION

The use of demand paging in a video memory of a video adapter allows virtualization of the video memory so that an active process and a background process may share access to the video memory. The active process is the one which is currently interacting with a user, whereas the background process is not interacting with the user. Unfortunately, the use of demand paging in the video memory may cause deadlocks, as will be described below. A preferred embodiment of the present invention enables detection and avoidance of deadlocks in an operating system that provides for a demand paged video memory of a video adapter.

Figure 1:
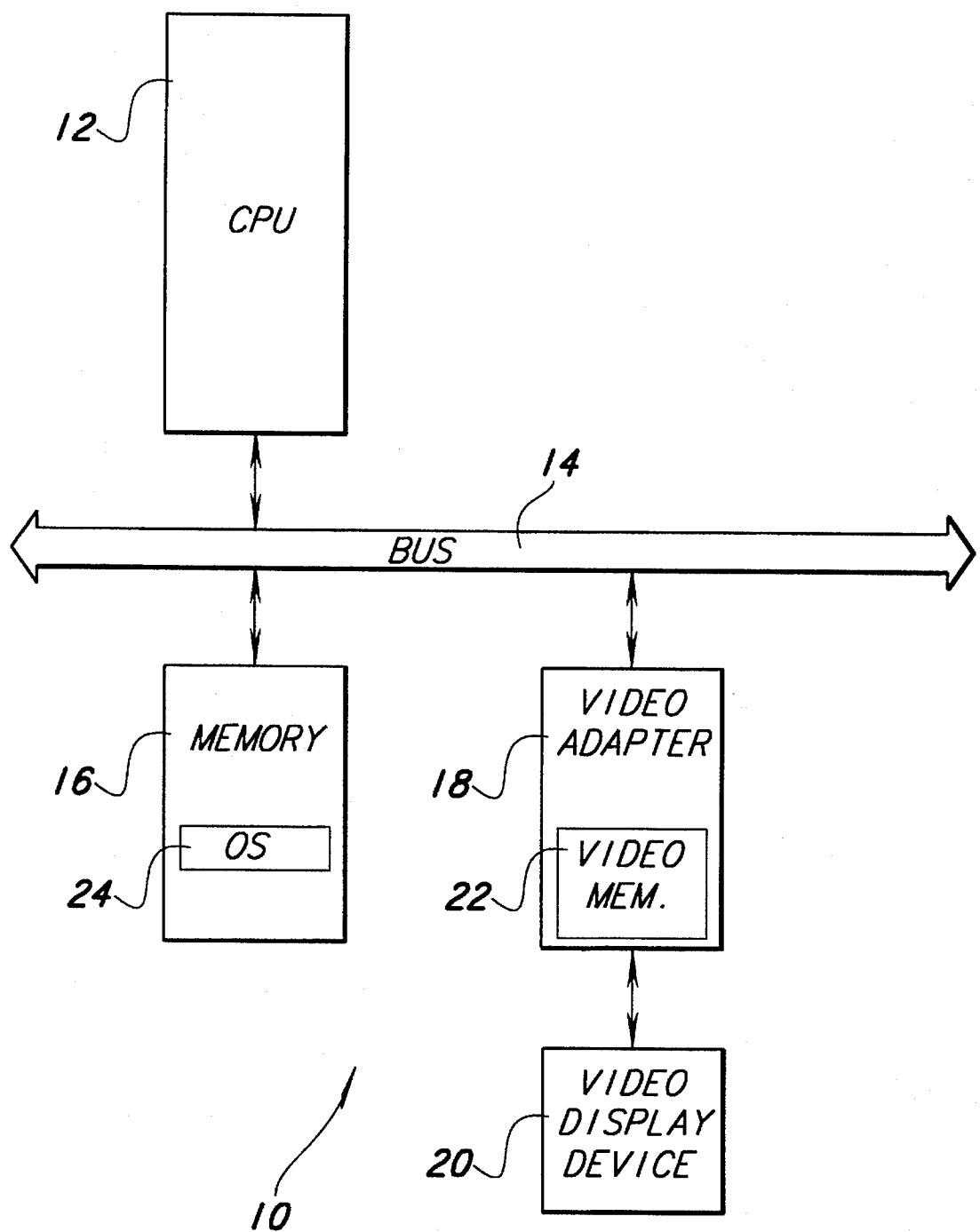
FIG. 1 is a block diagram of an illustrative data processing system for practicing a preferred embodiment of the present invention.

The preferred embodiment described herein may be implemented on a number of different types of data processing systems, including a system like that depicted in FIG. 1. The data processing system of FIG. 1 includes a central processing unit (CPU) 12, a memory 16, a video adapter 18, a video display device 20 and a bus 14. The CPU 12 communicates with the memory 16, the video adapter 18 and the video display device 20 through bus 14. The video adapter 18 serves as an interface between the bus 14 and the video display device 20. The video adapter 18 includes a video memory 22 for storing digital video data. An operating system (OS) 24 is stored in memory 16.

Those skilled in the art will appreciate that the data processing system 10 of FIG. 1 is merely illustrative and that the present invention may be implemented in other data processing system configurations.

Figure 2:
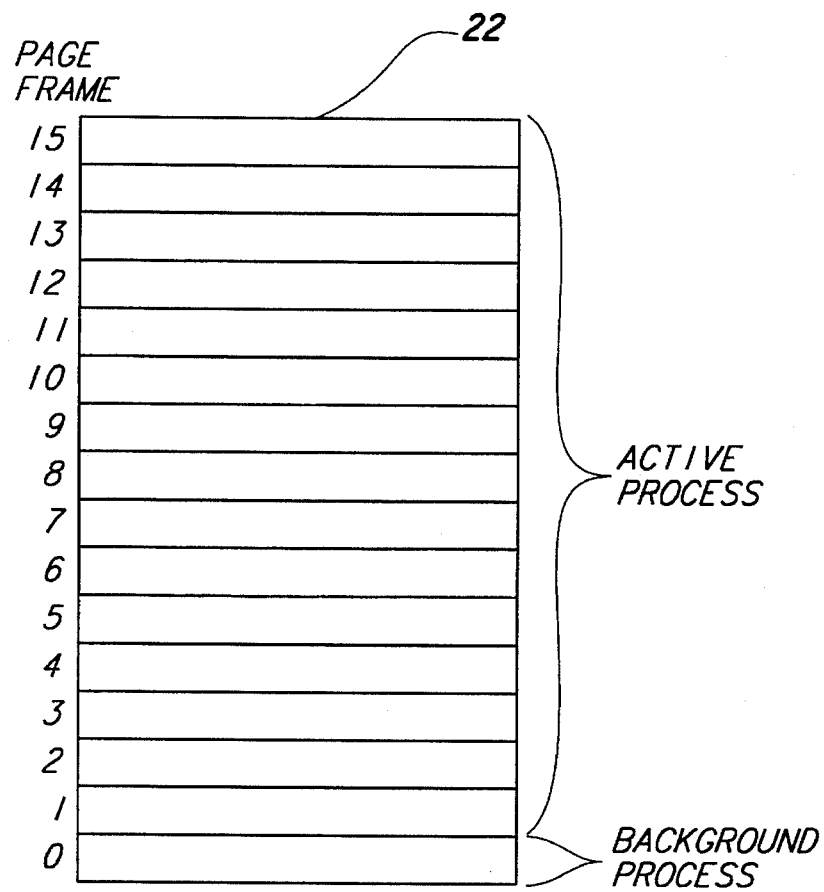
FIG. 2 is a more detailed block diagram of the video memory 22 of FIG. 1.

FIG. 2 depicts the video memory 22 in more detail. The video adapter 18 (FIG. 1) is a VGA type adapter, and thus, the video memory 22 (FIG. 2) has an addressable memory of 64K (i.e., 16 page frames that can each hold a 4K page), as was described above in the Background of the Invention. Those skilled in the art will appreciate that the present invention is not limited to the use of a VGA type video adapter. An active (foreground) process is granted exclusive access to 15 of the page frames (i.e., page frames 1–15) of the video memory 22. A background process is granted exclusive access to only one of the page frames (i.e., page frame 0). It should be appreciated that the background process need not be granted access to page frame 0; rather, it may be granted access to one of the other page frames instead. The selection of page frame 0 is merely illustrative.

Figure 3:
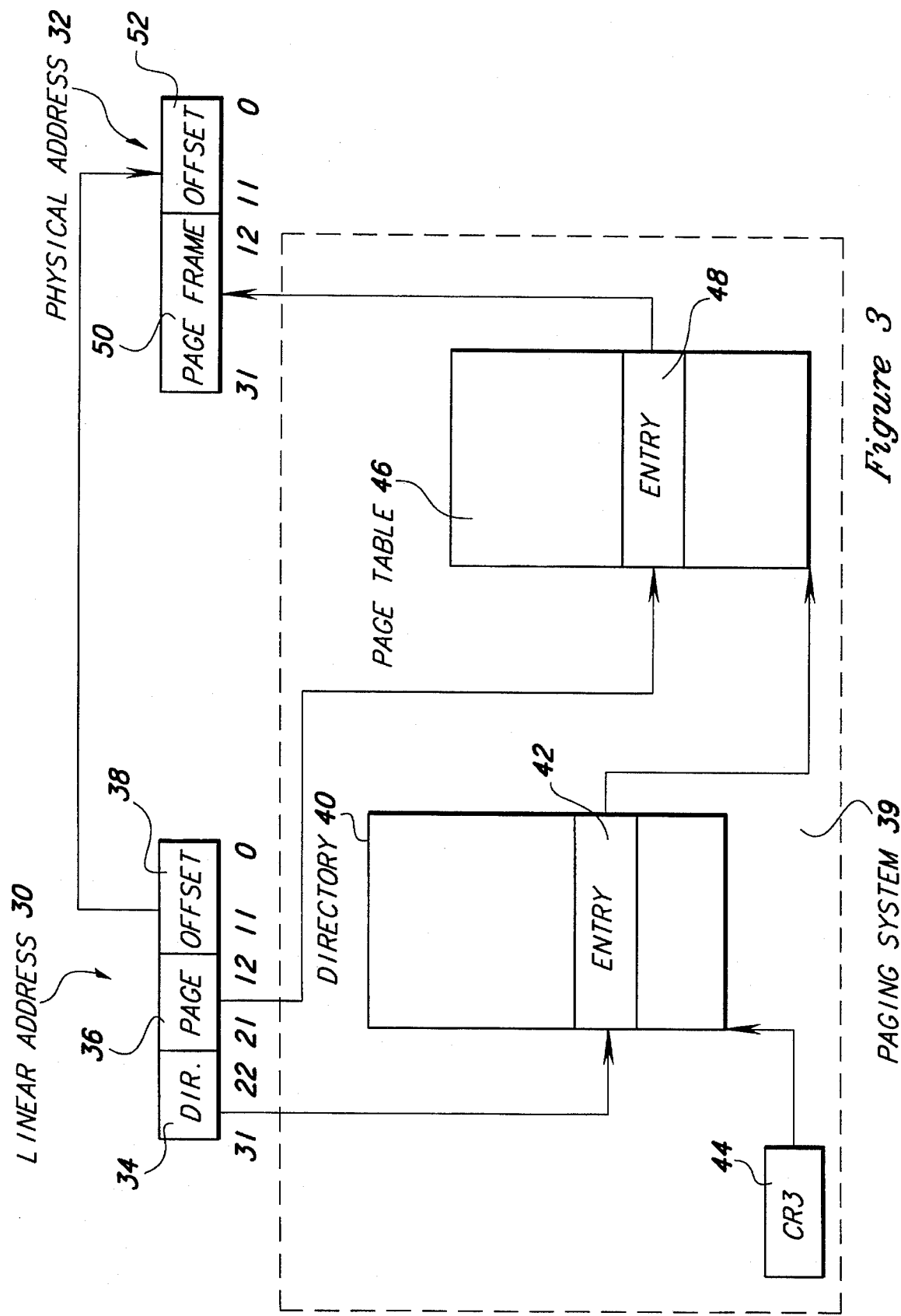
FIG. 3 is a block diagram of a paging system 39 that is suitable for use in the data processing system of FIG. 1.

The pages of video data are mapped from addresses in a linear address space, such as found in the 80386-based systems, into the page frames of the video memory 82. FIG. 3 depicts a paging system 39 that may be employed within the data processing system 10 (FIG. 1). The paging system 39 serves as a vehicle for mapping a linear address into a physical address.

The linear address 30 includes three fields: a page directory index field 34, a page table index field 36 and an offset field 38. The page directory index field 34 acts as an index into a page directory 40. The page table index field 36 holds an index into a page table 46, and the offset field 38 specifies an offset within a page frame. The paging system 39 uses the page directory index field 34 as an index into the page directory 40 to which a CR3 control register 44 of CPU 12 (FIG. 1) points. Entry 42 (FIG. 3) in the page directory 40 includes a pointer to page table 46. The page table index field 36 of the linear address 30 is subsequently used to select an entry 48 in page table 46. Entry 48 points to a page frame 50 in the physical memory address space. The page frame 50 is used in conjunction with an offset 52 (which is equal to offset 38 of the linear address 30) to produce the physical address 32.

As mentioned above, the video memory 22 (FIG. 2) is demand paged. Pages of memory are, therefore, not brought into the video memory 22 until they are demanded. If a page is demanded and a page is not currently present in the page frames of the video memory 22, a page fault occurs. When a page fault occurs, the operating system retrieves the requested page from the linear address space and places the page into the page frame of video memory 22. The page table 46 (FIG. 3) includes bits in each of its entries that specify whether the corresponding page is currently present in the video memory.

Unfortunately, as mentioned above, the use of the demand paging in the video memory 22 (FIG. 2) for a single page frame that is granted to a background process creates the possibility of a deadlock arising. Before describing how the preferred embodiment described herein avoids such a deadlock, it is helpful to consider how such a deadlock may arise. Suppose that an instruction, such as the MOVSB instruction in the 80386 assembly language, is executed on a data processing system like that shown in FIG. 1. Further suppose that an operating system, such as WINDOWS, version 3.1, that supports multi-processing and demand paging of the video memory is run on the data processing system.

Figure 4A:
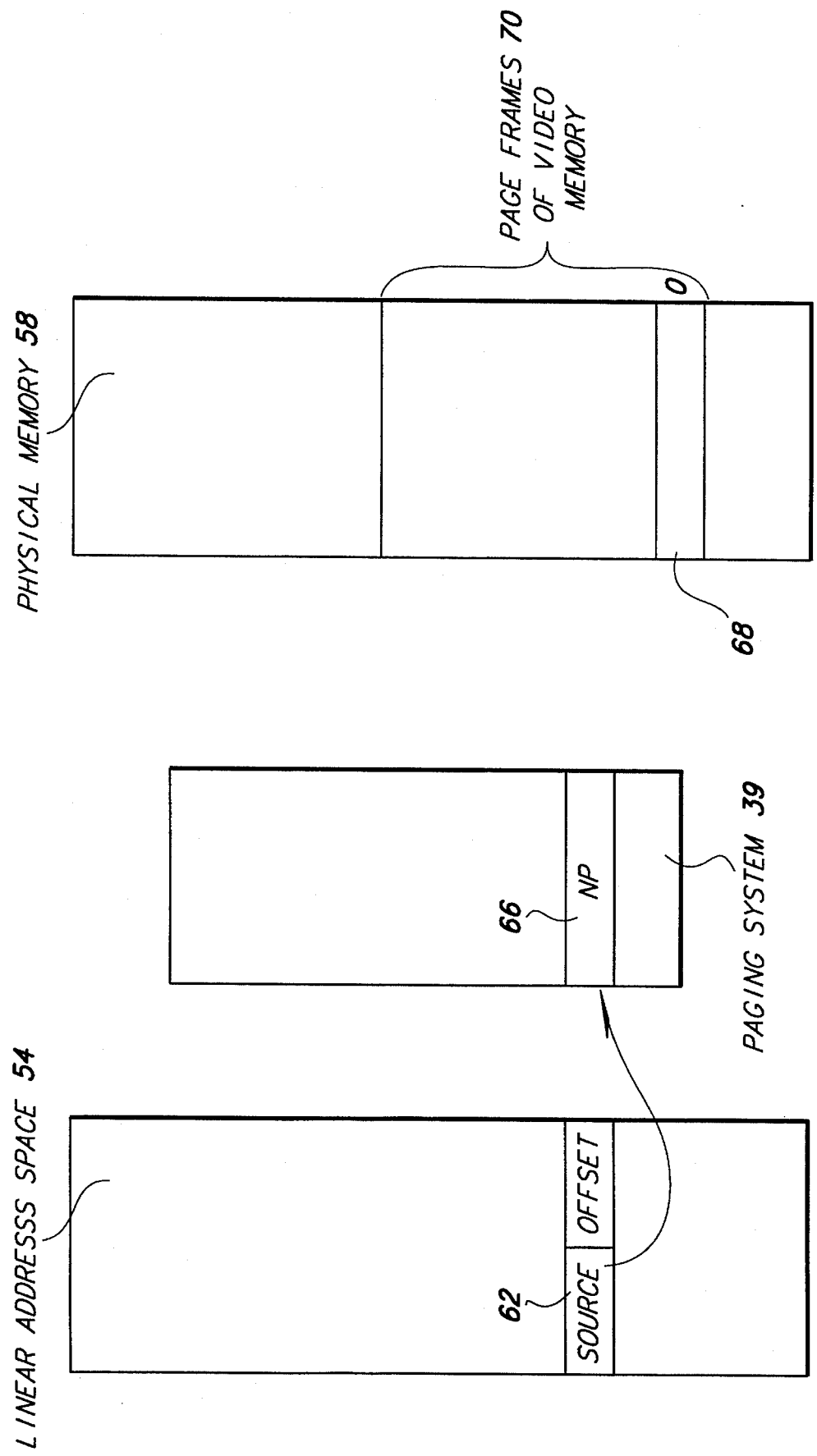
FIGS. 4a–4d are block diagrams illustrating how a deadlock may arise in a demand paged video memory.

The MOVSB instruction moves a byte of information from a source address in a source page to a destination address in a destination page. Further suppose that the source page and destination page are different, and additionally suppose that, initially, the page holding the source address is not present in the page frame 68 (i.e., page frame 0) of physical memory 58. Page frame 68 is the page frame in video memory which is granted to the background process. The address 62 of the source byte in the linear address space 54 is translated into a physical address using an entry 66 in a page table (like page table 46 of FIG. 3) of paging system 39 (FIG. 4a). The entry 66, however, includes a field that specifies that the desired page is not present (NP) in the video memory.

Figure 5:
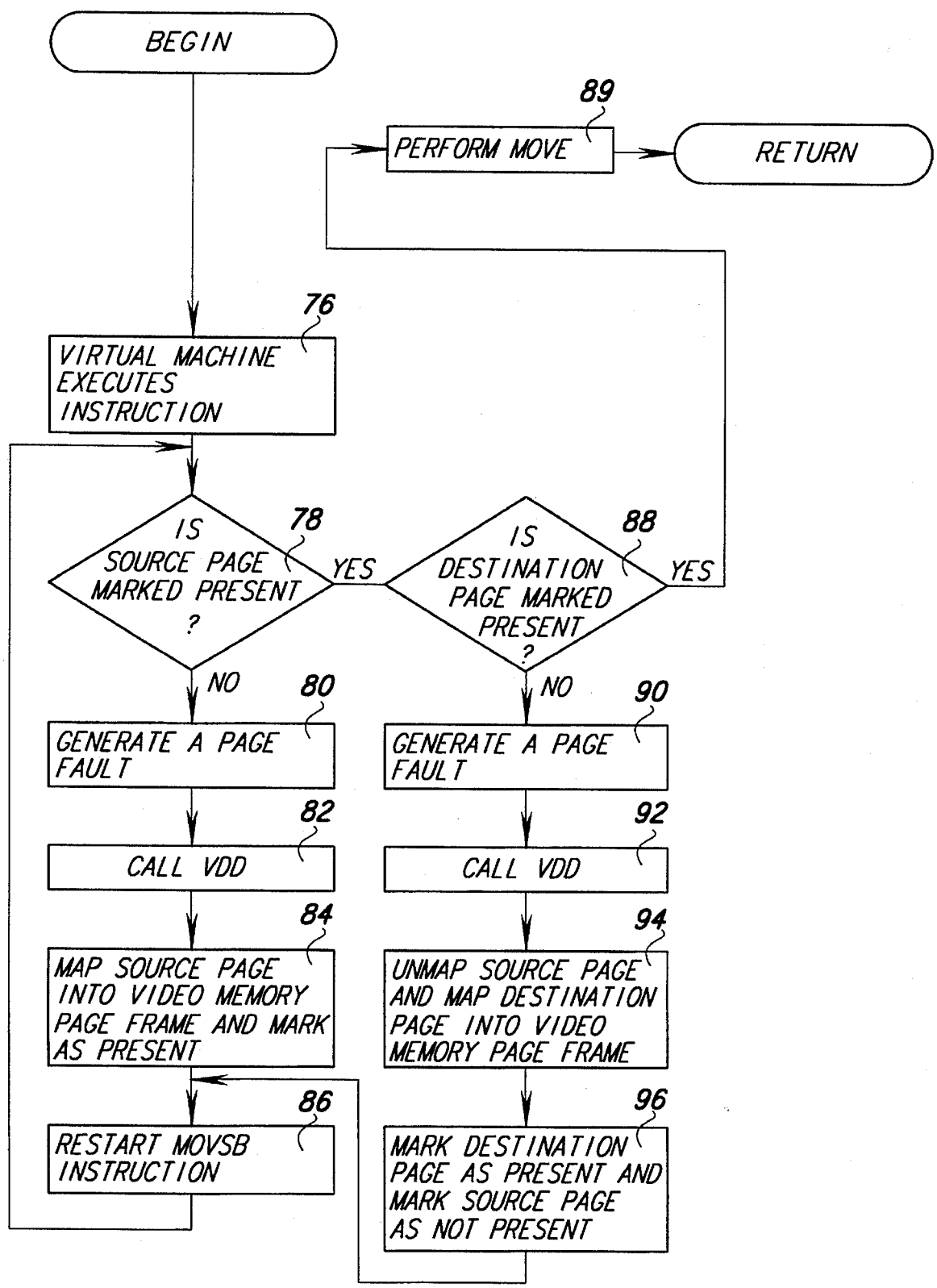
FIG. 5 is a flowchart illustrating the steps performed that lead to a deadlock in a demand paged video memory.

The steps performed by the data processing system in such a situation are set forth in a flowchart in FIG. 5. Initially, a virtual machine for the background process begins execution of the MOVSB instruction (step 76 in FIG.

Figure 4B:
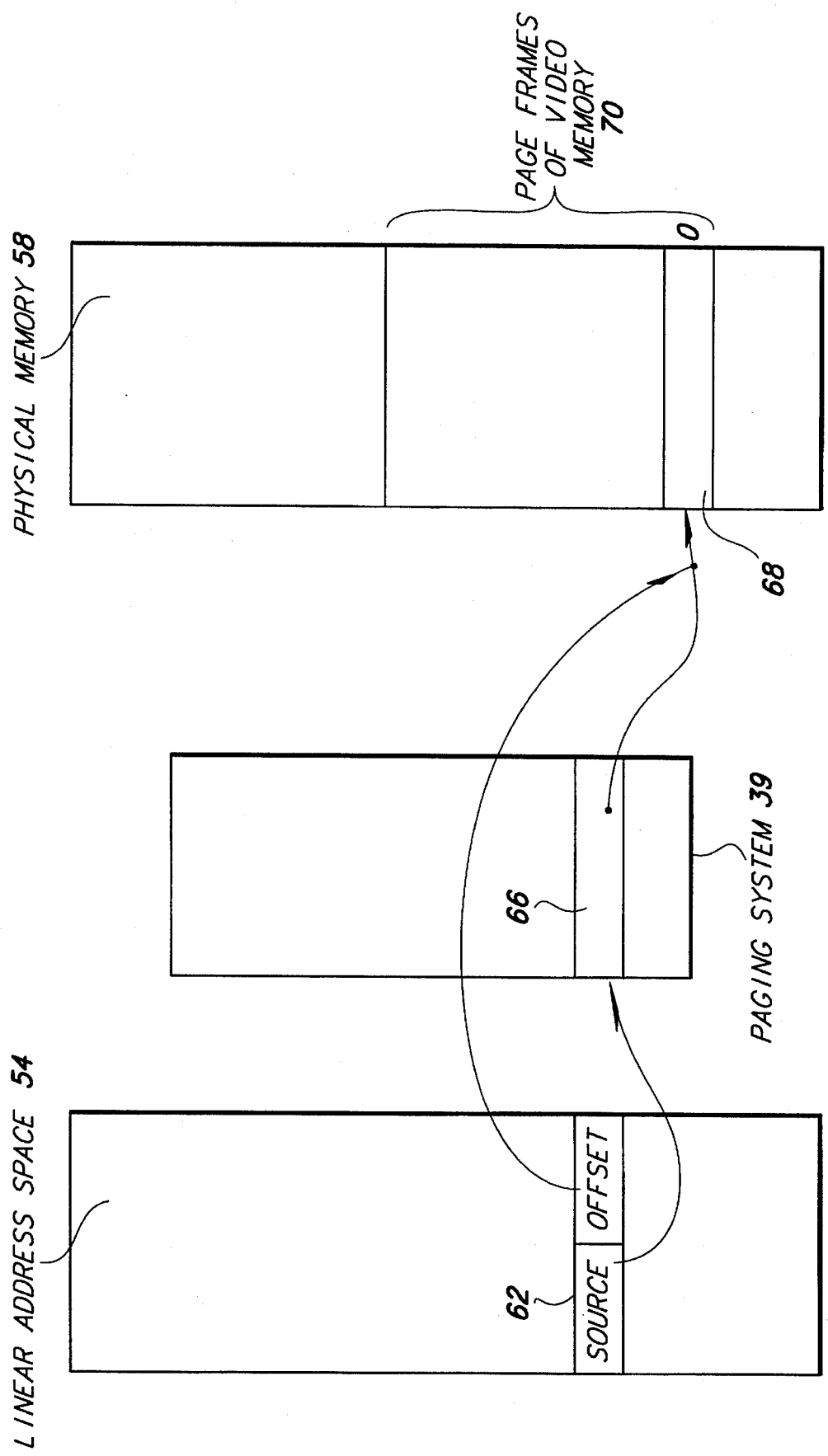

5). The CPU 12 (FIG. 1) then looks at page table entry 66 (FIG. 4a) of the paging system 39 and determines that the source byte is not present (NP) in page frame 68 (step 78 in FIG. 5). Since the page for the source byte is not present in page frame 68 (FIG. 4a), a page fault is generated (step 80 in FIG. 5). A call is then made to a virtual display device (VDD) in the operating system (step 82). The VDD is a module in the operating system that is responsible for the virtualization of the display device. Once the VDD is called, the VDD maps the source page into page frame 68 and marks the source page as present, as shown in FIG. 4b (step 84 in FIG. 5). Note that all of the page frames 70 of the video memory are mapped into the physical address space. The VDD then restarts the MOVSB instruction (step 86 in FIG. 5).

Figure 4C:
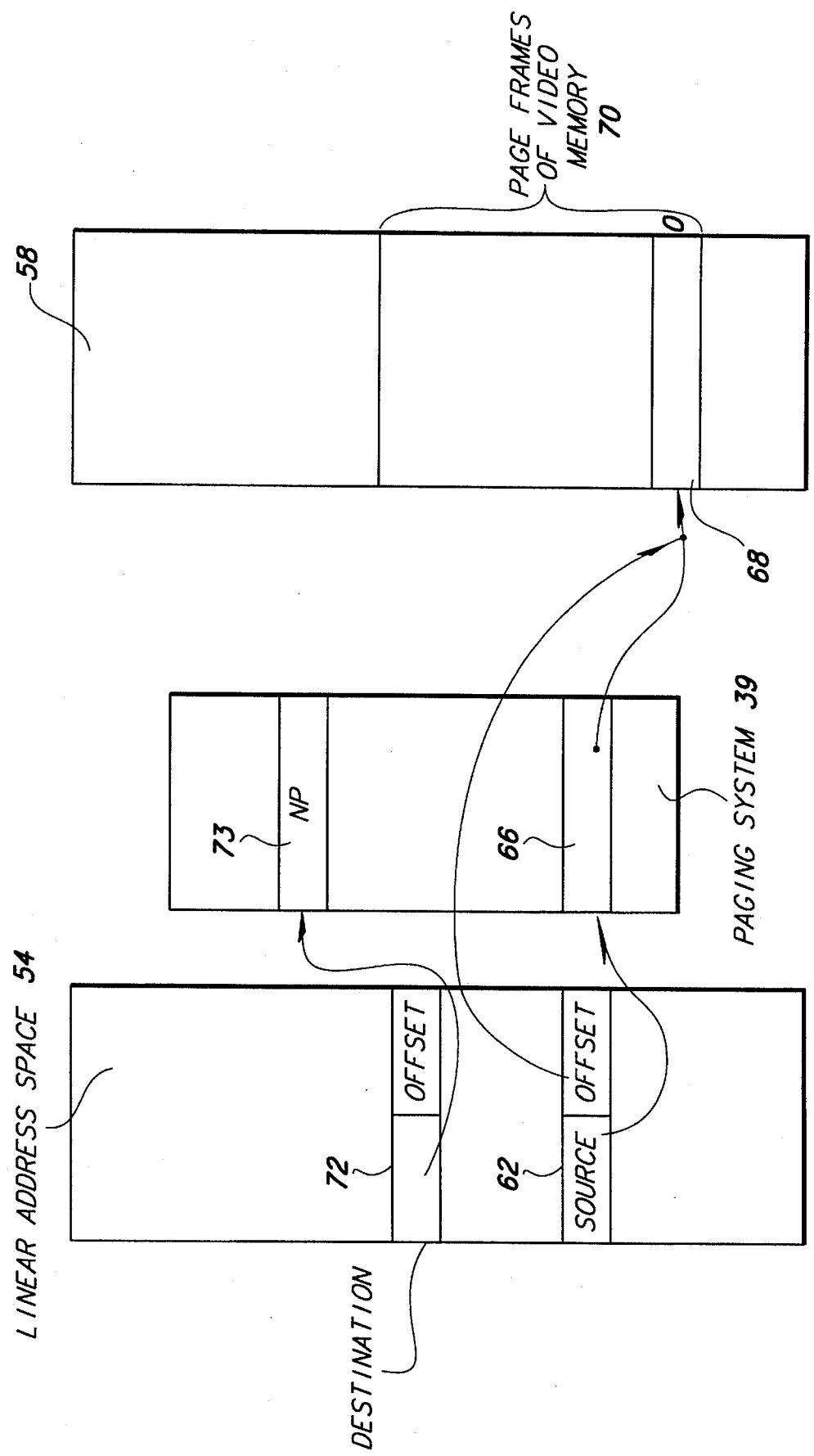

The system next checks again whether the source page is present (step 78 in FIG. 5). The source page is present in page frame 68 of the video memory; hence, the system checks whether the destination page is present in page frame 68 of video memory (step 88 in FIG. 5). If the destination page is present, then the move may be performed (step 89). However, in the above-described instance, the destination page is not present in page frame 68. FIG. 4c illustrates the memory state when step 88 of FIG. 5 is executed. The destination address 72 in the linear address space 54 points to a page table entry 73 in the paging system 39. Entry 73 includes bits specifying that the page holding the destination address is not present (NP) in the page frame 68, because page frame 68 is currently holding the source page.

Figure 4D:
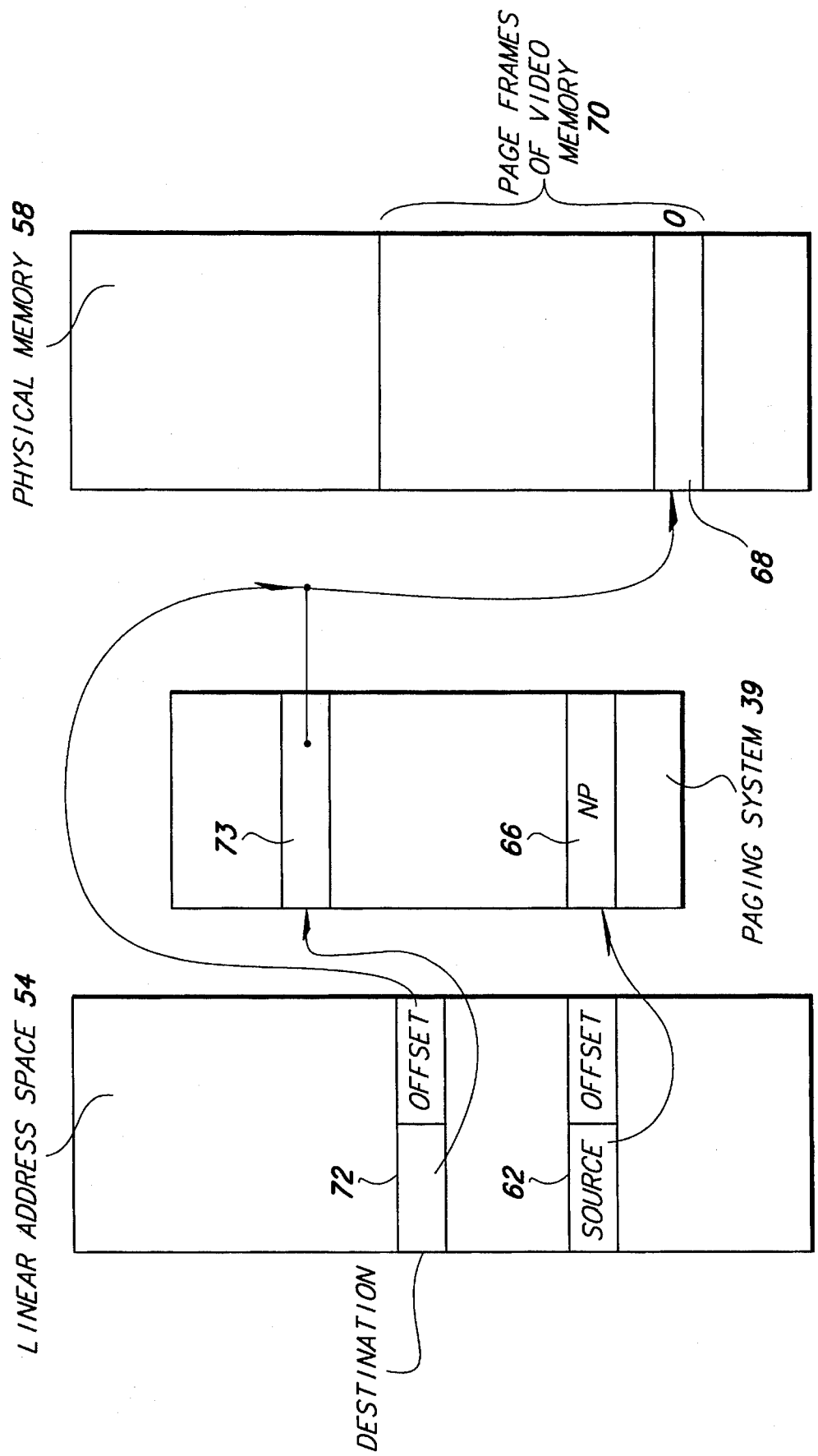

Because the destination page is marked "not present", the system generates a page fault (step 90 in FIG. 5). The VDD is called again (step 92), and the VDD replaces the source page in page frame 68 with the destination page (step 94). FIG. 4d depicts the memory state after the swapping of pages has occurred. The destination byte address 72 is mapped into the page table entry 73. The page table entry 73 includes a page frame specifier that is used in conjunction with the offset of the destination byte address 72 to point to an address within page frame 68. Page table entry 66 for the source byte address 62 is marked "not present" (see step 96 of FIG. 5).

The system then repeats step 78, which involves checking to see whether the source page is marked present. As the source page is no longer present, the whole process repeats itself. Thus, a deadlock is imperative. Deadlocks may also occur with other move instructions that move different sized pieces of data (e.g., instructions that move a word or double word). Similarly, deadlocks may also occur with other types of instructions that require concurrent access to two pages of memory in order to complete.

Figure 6:
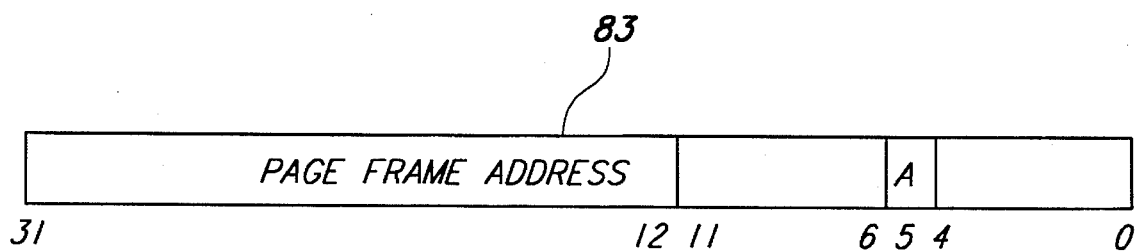
FIG. 6 is diagram depicting an illustrative page table entry format.

The preferred embodiment of the present invention described herein detects when a deadlock is imminent so that the deadlock may be avoided. Detection of the imminence of a deadlock is achieved by examining information provided within the page table entries. FIG. 6 provides the format for a page table entry 83 that is used in 80386-based systems. The page table entry 83 is 32 bits in length, and includes a page frame address and a number of status bits. Only the "A" status bit is shown in FIG. 6. The "A" bit specifies whether the page at the page frame address has been accessed. If the page has been read or written, the "A" bit holds a value of "1". The "A" bit is set by the processor when an access is performed.

When an instruction, like the MOVSB instruction, that requires a source byte from a source page and a destination byte from a destination page, is executed, the CPU executing the instruction does not actually read the source page until both the source page and destination page are present in physical memory. In a deadlock situation, the access bit of the source page and the access bit of the destination page are not set because neither has been accessed. Hence, the described preferred embodiment alters the VDD so that the VDD looks at the "A" bit of the page table entry for the source page upon page fault for the destination page.

Figure 7:
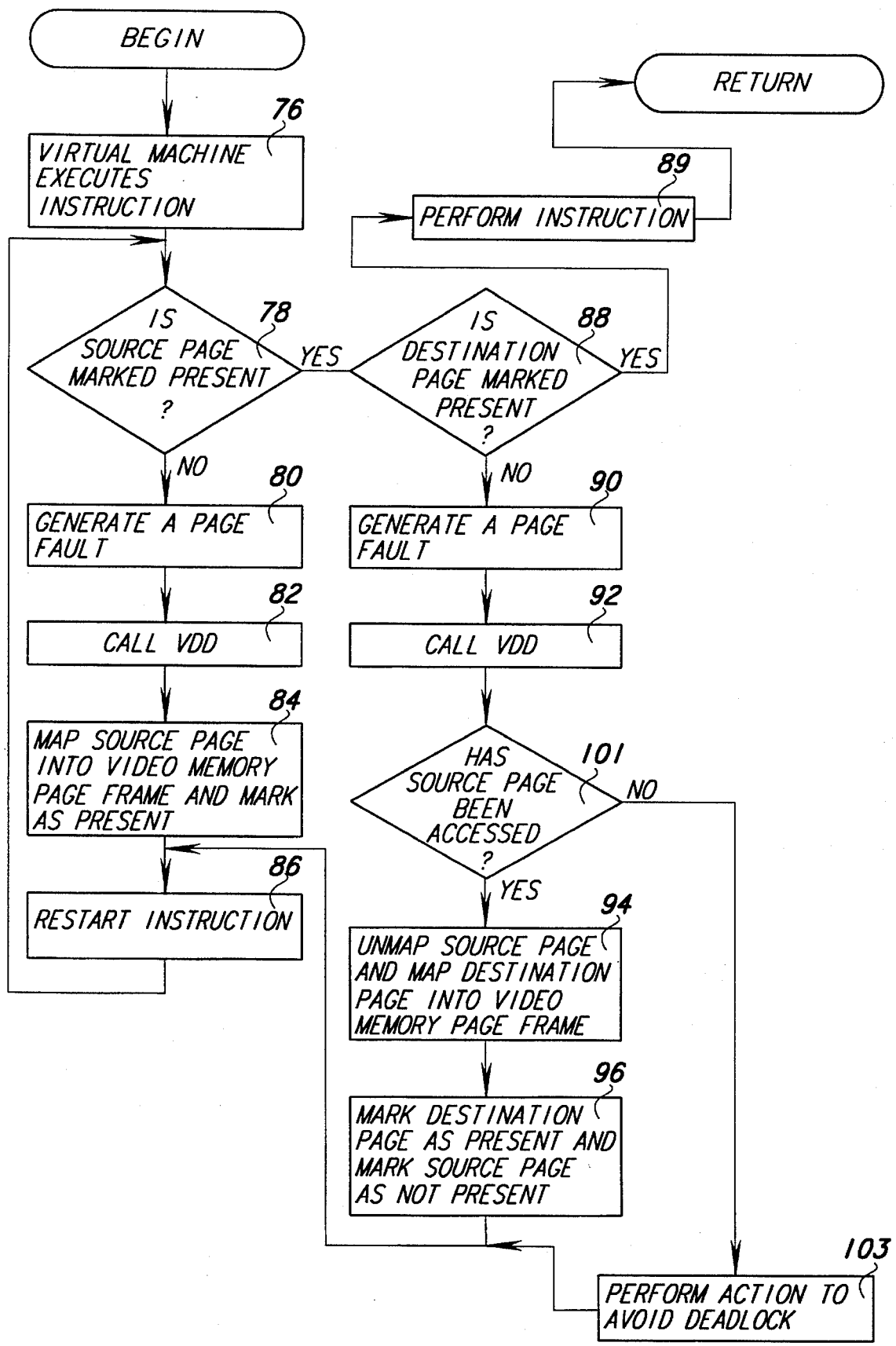
FIG. 7 is a flowchart depicting the steps performed by a preferred embodiment of the present invention described herein in avoiding a deadlock in a demand paged video memory.

FIG. 7 depicts the steps performed by a preferred embodiment during execution of an instruction. Steps 76, 78, 80, 82, 84, 86, 88, 90 and 92 are like those previously described with reference to FIG. 5. The described preferred embodiment differs from the approach of FIG. 5, however, when the VDD is called in step 92 (see FIG. 7). The VDD, instead of automatically unmapping the source page into the page frame and mapping the destination page into the page frame, examines the "A" bit in the page table entry for the source page to determine if the source page has been accessed (step 101 in FIG. 7). If the source page has already been accessed, there is not a possibility of deadlock, and thus, the system may perform steps 94 and 96 as previously described. In contrast, if the source page has not been accessed, a deadlock is imminent. The VDD then must take steps to avoid the deadlock (step 103). Such steps may include forcing the background process virtual machine to take complete ownership of the video memory 22 (FIG. 2) so that the virtual machine has enough video memory space to avoid the deadlock. Once the background virtual machine completes executing, the previously active virtual machine may then be restarted and completed. Alternatively, other approaches may be adopted that prevent the system from becoming deadlocked. Execution then proceeds as normal with the restarting of the instruction.

While the present invention has been described with reference to a preferred embodiment thereof, those skilled in the art will know of various changes in form and scope that may be made without departing from the spirit of the invention as defined in the appended claims. For instance, those skilled in the art will know of other actions that may be performed to avoid deadlocks which differ from that described above. In addition, other approaches are possible to detect a deadlock. One approach is to set a threshold of the number of times page faults may consecutively occur before a deadlock is presumed. Furthermore, those skilled in the art will know of other paging approaches and data processing configurations that may be used.

I claim:

1. In a data processing system including a processor and a memory having a plurality of pages and a plurality of page frames, each page and page frame for holding a page of information wherein the processor executes an instruction requiring a piece of information from a first page of the memory and a second page of the memory in order to complete the instruction, the location of the first page of the memory being different from the second page of the memory, and during the execution of the instruction the processor has access to only one page frame in the memory, a method comprising the steps of:

a) storing the page of information from the first page of the memory in the page frame;

b) determining whether the page of information stored in the page frame has been accessed; and c) where the page of information stored in the page frame has yet to be accessed, detecting that a deadlock is imminent.

2. A method as recited in claim 1, further comprising the step of storing in the memory an indication of whether the page of information stored in the page frame has been accessed, and the step of determining whether the page of information stored in the page frame has been accessed, further comprising the step of examining the stored indication.

3. A method as recited in claim 1, further comprising the step of storing an entry in a table for the first page that specifies whether the page of information from the first page has been accessed and storing an entry in the table for the second page that specifies whether the page of information from the second page has been accessed.

4. A method as recited in claim 3 wherein the table is a page table.

5. A method as recited in claim 1 wherein the instruction is an instruction for moving the piece of information to a location in the second page of the memory.

6. A method as recited in claim 1 wherein the page frame is in a video memory.

7. A method as recited in claim 1, further comprising the steps of detecting the absence of a deadlock, where the page of information stored in the page frame has been accessed, and completing execution of the instruction.

8. A method as recited in claim 1, further comprising the step of taking preventive measures to avoid the deadlock.

9. A method as recited in claim 8 wherein the step of taking preventive measures to avoid the deadlock further comprises the step of granting the processor access to at least one additional page frame.

10. In a data processing system having a memory including a video memory comprised of at least one page frame and a processor executing a process that has access to only one page frame of the video memory, said process requiring access to a page of information from a first page of the memory and a page of information from a second page of the memory, a method, comprising the steps of:
 a) mapping the page of information from the first page into the page frame to gain access to the page of information from the first page;
 b) determining whether the page of information mapped into the page frame has been accessed;
 c) where the page of information mapped into the page frame has been accessed, mapping the page of information from the second page into the page frame; and
 d) where the page of information from the first page mapped into the page frame has yet to be accessed, detecting a potential deadlock and taking measures to avoid the deadlock.

11. A method as recited in claim 10, further comprising the step of storing an indication regarding whether the page of information from the first page mapped into the page frame has been accessed.

12. A method as recited in claim 11 wherein the indication is stored in a page table.

13. A method as recited in claim 11 wherein the step of determining whether the page of information from the first page mapped into the page frame has been accessed, further comprises the step of examining the stored indication regarding whether the page of information from the first page mapped into the page frame has been accessed.

14. A method as recited in claim 10 wherein the step of taking measures to avoid the deadlock, further comprises the step of granting the process access to at least one additional page frame.

15. In a data processing system having a memory including a video memory, and having a processor concurrently running a first process and a second process, the memory having a plurality of pages and the video memory having a plurality of page frames, each page and page frame for holding a page of information, a method comprising the steps of:
 a) granting the first process access to several page frames of the video memory;
 b) granting the second process access to a single page frame of the video memory;
 c) when executing an operation for the second process wherein the operation requires access to at least two different page frames of the video memory,
  i) transferring a page of information from a first page of the memory into the single page frame;
  ii) determining whether the first page of information in the single page frame has been accessed; and
  iii) where the first page of information in the single page frame has yet to be accessed, detecting that a deadlock is imminent; and
 d) taking steps to avoid the deadlock.

16. A method as recited in claim 15 wherein the step of detecting that the deadlock is imminent further comprises the step of determining whether the first page of information in the single page frame has been accessed, when the first page of information from the first page is in the single page frame and the page of information from the second page is demanded.

17. A method as recited in claim 15 wherein the step of taking steps to avoid the deadlock, further comprises the steps of granting the second process access to at least one additional page frame among the several page frames and denying the first process access to the at least one additional page frame among the several page frames previously granted to the first process.

18. A method as recited in claim 17 wherein the at least one additional page frame comprises all of the several page frames granted to the first process, and the at least one additional page frame and the single page frame comprise all of the page frames in the video memory.

19. In a computer system including a processor and a memory containing a plurality of pages and a plurality of page frames with each page and page frame holding a page of information, a method of detecting a deadlock comprising the steps of:
 executing an instruction requiring access to a piece of information from a first page of the memory and a piece of information from a second page of the memory, the location of the first page of the memory being different from the second page of the memory, wherein during the execution of the instruction the processor has access to only one page frame in the memory;
 retrieving the page of information from the first page of the memory into the only one page frame accessible by the processor;
 determining whether the page of information retrieved into the only one page frame has been accessed by the processor; and
 where the page of information retrieved into the only one page frame has yet to be accessed, detecting that a deadlock is imminent.

20. A method as recited in claim 19 wherein the computer system includes a page table having an entry for storing an indication of whether the page of information retrieved into the only one page frame has been accessed by the processor, and the step of determining whether the page of information retrieved into the only one page frame has been accessed includes the step of examining the stored indication in the entry of the page table.

21. In a computer system having a processor and a memory containing a plurality of pages and a plurality of page frames with each page and page frame holding a page of information, the processor concurrently running a first process and a second process, a method of avoiding a deadlock comprising the steps of:

granting the first process access to several page frames of the memory;

granting the second process access to a single page frame of the memory other than the several page frames granted to the first process; and when executing the second process, executing an instruction requiring access to a piece of information from a first page of the memory and a piece of information from a second page of the memory, the location of the first page of the memory being different from the second page of the memory;

retrieving the page of information from the first page of the memory into the single page frame granted to the second process;

determining whether the page of information retrieved into the single page frame has been accessed by the processor;

where the page of information retrieved into the single page frame has yet to be accessed, detecting that a deadlock is imminent; and to avoid the imminent deadlock, granting the second process access to at least one additional page frame other than the single page frame granted to the second process.

22. A computer readable storage medium for use in a data processing system including a processor and a memory having a plurality of pages and a plurality of page frames, each page and page frame for holding a page of information wherein the processor executes an instruction requiring a piece of information from a first page of the memory and a second page of the memory in order to complete the instruction, the location of the first page of the memory being different from the second page of the memory, and during the execution of the instruction the processor has access to a single page frame in the memory, the content of the computer readable storage medium causing the processor to perform the steps of:

a) storing the page of information from the first page of the memory in the page frame;

b) determining whether the page of information stored in the page frame has been accessed; and c) where the page of information stored in the page frame has yet to be accessed, detecting that a deadlock is imminent.

23. The computer readable storage medium according to claim 22, the content of the computer readable storage medium causing the processor to further perform the steps of:

storing an entry in a page table for the first page that specifies whether the page of information from the first page has been accessed; and storing an entry in the page table for the second page that specifies whether the page of information from the second page has been accessed.

24. The computer readable storage medium according to claim 22, the content of the computer readable storage medium causing the processor to further perform the steps of:

detecting the absence of a deadlock, where the page of information stored in the page frame has been accessed; and completing execution of the instruction.

25. The computer readable storage medium according to claim 22, the content of the computer readable storage medium causing the processor to further perform the step of granting the processor access to at least one additional page frame when the imminent deadlock is detected.

26. A computer readable storage medium for use in a data processing system having a memory including a video memory, and having a processor concurrently running a first process and a second process, the memory having a plurality of pages and the video memory having a plurality of page frames, each page and page frame for holding a page of information, the content of the computer readable storage medium causing the processor to perform the steps of:

granting the first process access to several page frames of the video memory;

granting the second process access to a single page frame of the video memory;

when executing an operation for the second process wherein the operation requires access to at least two different page frames of the video memory, transferring a page of information from a first page of the memory into the single page frame;

determining whether the first page of information in the single page frame has been accessed; and where the first page of information in the single page frame has yet to be accessed, detecting that a deadlock is imminent; and taking steps to avoid the deadlock.

27. The computer readable storage medium according to claim 26 wherein the step of detecting that the deadlock is imminent further comprises the step of determining whether the first page of information in the single page frame has been accessed, when the first page of information from the first page is in the single page frame and the page of information from the second page is demanded.

28. The computer readable storage medium according to claim 26 wherein the step of taking steps to avoid the deadlock further comprises the steps of:

granting the second process access to at least one additional page frame among the several page frames; and denying the first process access to the at least one additional page frame among the several page frames previously granted to the first process.

29. The computer readable storage medium according to claim 28 wherein the at least one additional page frame comprises all of the several page frames granted to the first process, and the at least one additional page frame and the single page frame comprise all of the page frames in the video memory.

30. A computer readable storage medium for use in a data processing system having a memory including a video memory comprised of at least one page frame and a processor executing a process that has access to only one page frame of the video memory, the process requiring access to a page of information from a first page of the memory and a page of information from a second page of the memory, the content of the computer readable storage medium causing the processor to perform the steps of:

mapping the page of information from the first page into the page frame to gain access to the page of information from the first page;

determining whether the page of information mapped into the page frame has been accessed;

where the page of information mapped into the page frame has been accessed, mapping the page of information from the second page into the page frame; and where the page of information from the first page mapped into the page frame has yet to be accessed, detecting a potential deadlock and taking measures to avoid the deadlock.

31. The computer readable storage medium according to claim 30 wherein the step of taking measures to avoid the deadlock, further comprises the step of granting the process access to at least one additional page frame.

\* \* \* \* \*